June 28, 1938.  L. BOUDIN ET AL  2,122,083
METHOD OF AND APPARATUS FOR PRODUCING CORRUGATED GLASS SHEETS
Filed July 30, 1935  3 Sheets-Sheet 1
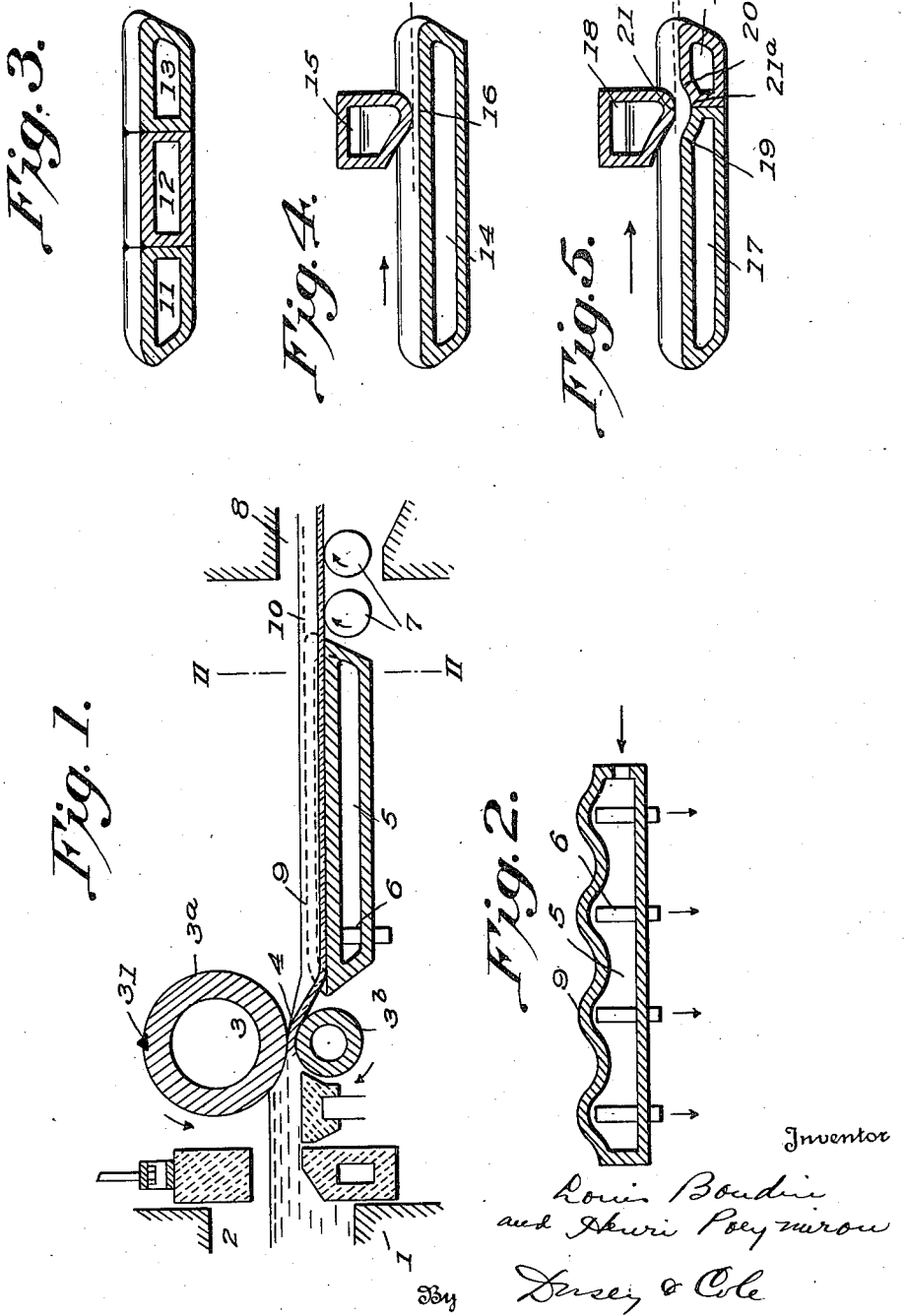

June 28, 1938. L. BOUDIN ET AL 2,122,083
METHOD OF AND APPARATUS FOR PRODUCING CORRUGATED GLASS SHEETS
Filed July 30, 1935 3 Sheets-Sheet 2
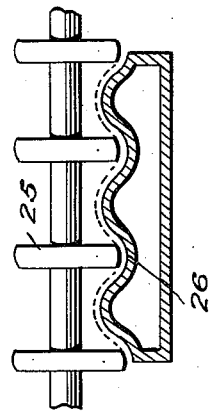
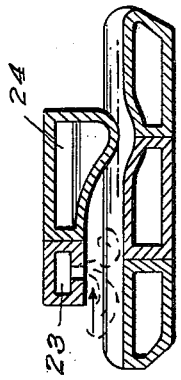
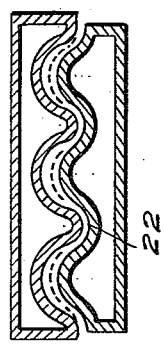
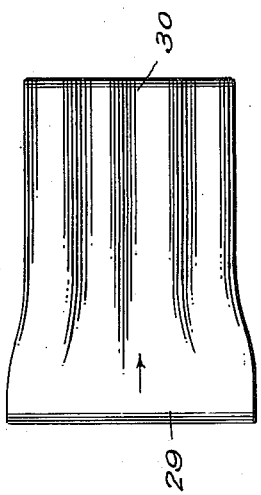
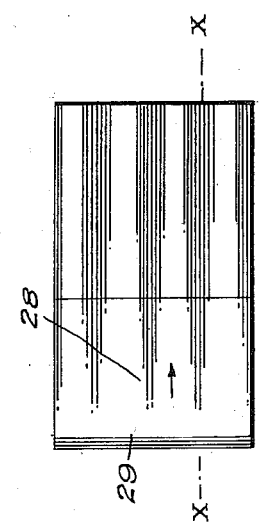
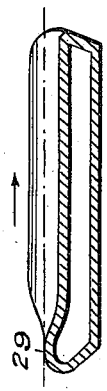
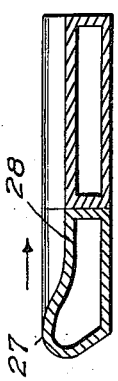

June 28, 1938.  L. BOUDIN ET AL  2,122,083
METHOD OF AND APPARATUS FOR PRODUCING CORRUGATED GLASS SHEETS
Filed July 30, 1935  3 Sheets-Sheet 3
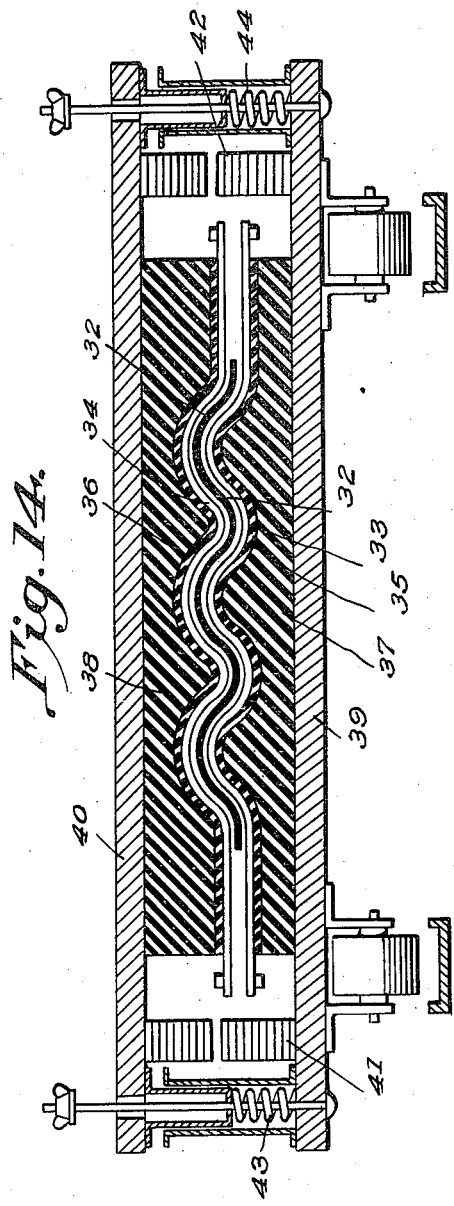
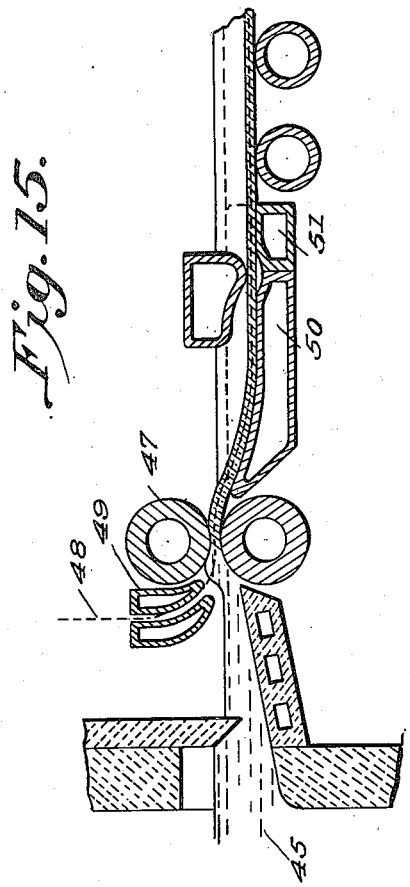

Patented June 28, 1938

2,122,083

UNITED STATES PATENT OFFICE 2,122,083

METHOD OF AND APPARATUS FOR PRODUCING CORRUGATED GLASS SHEETS

Louis Boudin, St.-Gobain, and Henri Poeymirou, Asnieres, France, assignors to Société Anonyme des Manufactures des Glaces & Produits Chimiques de Saint-Gobain, Chauny & Cirey, Paris, France Application July 30, 1935, Serial No. 33,908
In France July 31, 1934

15 Claims. (Cl. 49—33)

The present invention relates to the continuous manufacture of sheet glass the surface of which may be considered as defined by the displacement of any curved line parallel to it along rectilinear trajectories. It also relates particularly to the manufacture of corrugated glass for covering roofs, in combination with corrugated sheets of different material, such as metal, cement, etc.

Corrugated glass has been manufactured according to old or known methods by means of a pair of channelled rolls between which is engaged the glass intended to form the sheet and which is or is not preliminarily rolled, whereby the glass is in a suitable state of temperature and plasticity. The rolls may have channels or grooves parallel with their rotational axis or circular channels or grooves disposed in planes perpendicular to this axis. In the first case the sheet is corrugated transversely to its direction of movement, in the second the corrugations are longitudinal.

In both cases the rolls are necessarily of different diameters from one point to another, so that for a constant angular velocity of the rolls and linear velocities of the points which come in contact are different from each other. The result is that the sheet, which is carried along unequally and irregularly by the rolls is distorted and wrenched and its appearance thus damaged.

Furthermore, the rolls act on the glass only during the, necessarily limited, period in which it is engaged in the minimum zone between the rolls. The glass sheet or plate leaves the rolls before having acquired the rigidity necessary to retain the shape imparted thereto and becomes distorted, thus interfering with its use, since this plate must be fitted to others having a regular and well defined shape.

The present invention is designed to overcome the above defects. It consists in passing a flat glass sheet continuously and uniformly over a stationary shaping member having a profile suitable for giving the desired form to the glass, which latter is at the time in a state of plasticity desired to assume the corrugations of this shaping member.

The corrugations of the shaping member extend in the advance direction of the plate (or sheet).

The still plastic portion of the sheet which passes over the shaping member is carried along by the rigid portion which passes therefrom. By means of suitable members, for example rollers, a constant movement is imparted to this rigid portion, so that the sheet is moved uniformly during the entire shaping operation.

The sheet is moved on the shaping member substantially horizontally so that, by suitably regulating the plasticity of the glass the latter may assume the form of the corrugations simply through its own weight.

Means are provided to regulate the temperature of the sheet and thus its plasticity during its passage over the shaping member, the regulation being applicable along the direction in which the sheet moves as well as transversely.

The shaping of the plate may be promoted by means of suitable devices located above the sheet and the shaper and acting on the sheet to apply it on the bottom of the grooves of the shaper.

It is also possible to vary progressively the corrugations of the shaper and those of the device placed above the sheet so as to form a likewise progressive conformation of the glass plate. This variation may be provided in the depth as well as in the spacings of the grooves. It may be the same or different for all the corrugations which form the sheet.

Several advantages of this method are as follows.

At all points the movement of the sheet is constant and uniform relative to the surface of the shaper, and the temperature may be regulated as desired to the suitable degree, thus avoiding superficial defects, such as sticking, marking, scoring, etc. and the superficial properties of the original flat sheet may thus be retained.

With the means described it is possible to obtain a corrugated sheet of exact profile and uniform thickness.

These various means as well as their advantages will appear from the following description as well as from the accompanying drawings which illustrate different exemplary embodiments of the invention.

Figure 1 is a diagrammatic vertical longitudinal section of one embodiment of the invention combined with a tank furnace, a continuous rolling mill and a tempering or annealing chamber.

Figure 2 is a cross section on line II—II of Figure 1.

Figures 3, 4 and 5 are vertical longitudinal sections relative to the different constructions of the shaper.

Figures 6 and 8 are cross sections and Figure 7 a longitudinal section relative to different embodiments of the method.

Figures 9 and 10 show another method of constructing the shaper, Figure 9 being a plan view and Figure 10 a vertical section on line X—X of Figure 9.

Figure 11 is a plan view of another embodiment of the shaper.

Figure 12 is a vertical longitudinal section relative to another modification in the arrangement of the shaper.

Figure 13 relates to a method of cutting the corrugated plate.

Figure 14 is a cross section of a cutting device, and

Figure 15 is a vertical longitudinal section of a device pertaining to the present invention for the manufacture of reinforced corrugated glass.

In Figures 1 and 2, 1 is the wall of a tank furnace, 2 a glass discharge opening, 3 a continuously fed rolling mill, consisting of the upper roll 3a and the lower roll 3b, said rolls being arranged to provide a sheet forming pass for the production of the glass sheet 4. Subsequent to the emergence of the glass from the forming pass it is delivered to a shaping element or table 5. The latter is formed of a metallic table the upper part of which is provided with parallel grooves corresponding to those to be given the sheet; Figure 2 shows the profile of this table. The table also forms a kind of caisson having therein a continuous water circulation for regulating the temperature of the table. The pipes 6 for discharging the water terminate at the upper part of the corrugations and assure contact of the water with all points of the shaper. 7 designates conveyor rolls and 8 the entrance to the annealing or tempering chamber.

Operation of the apparatus is as follows: On passing from the forming rolls the sheet of glass passes over the table 5 and beginning to slide over the upper part 9 of the corrugations; inasmuch as the glass is still soft the sheet sinks through its own weight at the points in which it is not supported and is drawn transversely, thus assuming the corrugated form of the table in proportion to its advance. On passing from the shaping element or table the corrugated glass plate, which at this time is sufficiently cool to be supported without being deformed by the rollers 7, is engaged thereon. These rollers contact with the lower generatrice of the corrugations and impart a continuous advance movement to the sheet.

It is preferable to be able to regulate the temperature independently in the different phases of the shaping. For this purpose the invention provides that the shaping element or table may be subdivided into a series of different sections or compartments into which water or other fluid may be admitted at temperatures which are different in the different sections. These sections need not have an interior circulation, may be of different character, for example of refractory material. They may also serve for heating the sheet and for this purpose be provided with gas burners or electric heating devices.

By way of example Figure 3 shows a shaping member consisting of three sections disposed successively in the direction in which the sheet moves. In the first section indicated at 11, which corresponds to the forming of the sheet, it is endeavored to obtain the highest temperature, so as to maintain the glass plastic. In the following sections 12 and 13 the temperature is regulated so that the sheet, on passing from the shaping element has sufficient rigidity, without however being cooled down to a dangerous point.

It is to be understood that the shaper shown in Figure 3 is given by way of example only, and that the subdivision into compartments or sections may also be provided transversely, so that the temperatures and shaping conditions may be regulated differently in this direction. Particularly is it possible with this shaper to compensate for the inequalities of temperature at the exit from the forming rolls between the edges and the centre of the sheet.

For regulating the temperature of the sheet as well as the shaping conditions it is possible also to modify the duration of passage of the sheet in the different shaping phases, the invention providing therefor a modified length of the shaping element in each of these phases, either by replacing the corresponding sections by others of suitable length or by modifying, in each series, the number of elementary sections disposed consecutively.

The invention thus provides means in each case for realizing the conditions required for the plastic and thermal state of the sheet, which is particularly advantageous when it is desired to manufacture products of different thicknesses and employ different production speeds.

When the shape or profile to be given the glass comprises accentuated design parts the effect of weight is not always sufficient to apply the sheet accurately over all the profile of the shaping element or table. In order to overcome this inconvenience the invention provides devices which, while retaining the advantages described, force the sheet to assume accurately the desired profile. Figure 4 represents one of these devices by way of example. The shaping element or table is indicated at 14. 15 is a counterplate disposed above the shaping element and the sheet, at a suitable distance from the entrance to the shaping element. The counter-plate 15 is arranged to apply the sheet accurately on the shaping element or table and in aid of this operation the space between the two members decreases progressively and in proportion to the advance of the sheet to a value which, at the point 16, corresponds to the thickness of the sheet.

It has been found advantageous to increase the effectiveness of the counter-plate 15 and prevent the danger of stopping the sheet in its passage between the two members in case of excess thickness, by providing the shaper with a depression located below the counter-plate. Figure 5 shows such arrangement. 17—17a is the shaping element and 18 the counter-plate; the points 19 and 20 of the shaping element and point 21 of the counter-plate are of exactly the same gage as the corrugations to be given the sheet. Between points 19 and 20 the shaping element is provided with a depression 21a directly below the point 21, so that danger of wedging the sheet between the two members is precluded.

The counter-plate may also act only at certain points of the profile, for example as indicated on Figure 6 at the bottom of the corrugations at 22.

Like the shaping element, the counter-plate may also consist of separate sections or compartments by means of which it is possible to exert suitable action on the temperature and the conformation of the sheet at any point. By way of example Figure 7 shows a counter-plate comprising a part 23 performing the function of a heat applying medium to maintain or increase the plasticity of the glass, and a part 24 having a water circulation, to form a guide in the manner described.

Figure 8 relates to another device for the same purpose; a series of rollers 25, driven or not, and having a peripheral velocity equal to that of the sheet at their point of contact therewith, applies the sheet in the bottom of the grooves or corrugations at 26. A plurality of rollers mounted on the same shaft and having different diameters may be used to apply the sheet at different points of the profile of the grooves. These rollers may rotate freely relative to each other so that their peripheral velocity may, for each, be the same as the rate of movement of the sheet. As in the preceding embodiment it is of advantage in certain cases to hollow out or depress the shaper at the point at which the rollers exert their action.

Figures 9 and 10 relate to the part of the invention concerning the progressive action of the shaping element. For certain designs of corrugations, for example when the depth of the grooves is great as compared with the width or spacing in order to shape the glass uniformly and avoid adherence or sticking on entrance into the shaping element, it is preferable to support the sheet during the time it sinks under its own weight. For this purpose the shaper is provided with grooves which, at the beginning of the shaping element have no or very slight depth and which then increase progressively in depth to the final required gage. Figures 9 and 10 show such arrangement; 27 designates the entrance to the shaping element and 28 the point at which the corrugations reach their complete depth.

In the various types of shaping elements described the shaping of the sheet is generally accompanied with a decrease in thickness, due to the fact that the sheet elongates transversely in assuming the corrugations. This decrease affects certain parts of the profile, such as the flanks of the corrugations, more than others, and causes differences in thickness which, in certain cases, may negative the value of the product. In order to avoid these differences the invention provides two means.

In the first, not shown on the accompanying drawings, the excess local thicknesses are rolled out, thus compensating for the inequalities of drawing produced by the shaping.

In the second the shaping is carried out so that there is no transverse elongation of the sheet. For obtaining this result use may be made of a shaping element wherein the corrugations vary progressively from the entrance to the shaper in their spacing or separation, this spacing decreasing in proportion as the corrugation of the sheet is accentuated, so that the cross section of the sheet constantly retains the developed extent. The device may be used alone or combined with a progressive increase of the depth of the corrugations of the shaping element.

Figure 11 relates to a shaping apparatus of this type. The entrance is at 29 and the exit at 30. At the entrance the shaping element has a part which is not or only slightly corrugated. Following, and along the advance direction of the sheet, the corrugations increase progressively in depth. Their spacing decreases at the same time, as shown, so that each part of the profile between two corrugations has a constant developed length. The result is that the point of the sheet which will have begun to pass, for example, over the ridge of a corrugation continues to follow the same part of the profile, and the sheet will not slide laterally relative to the shaping element, while being bent between the corrugations to shape it. This latter may be effected at a temperature lower than when it requires a change of transverse dimension of the sheet.

It is to be understood that these descriptions and the various methods of realization represented by the accompanying figures are given by way of example only, and that the invention includes all means suitable for regulating the conditions of forming the corrugations on the shaper.

The arrangements shown on Figures 9, 10 particularly whose corrugations, with respect to the flat zone at the entrance of the plate are disposed along hollow parts. It is apparent that opposite this arrangement the corrugations may be disposed in relief relative to the entrance plane or be disposed in an intermediate manner, the top of the corrugations being above the bottom below this plane. Figure 12 shows a shaper of this kind.

It is also possible to adjust vertically as well as horizontally the position of the shaping element or table with respect to the forming rolls. The only essential is to place the shaper at a level such that the lower part of the grooves is at the level of the rollers of the annealing chamber into which the sheet enters.

Finally, the invention provides means for cutting the strip of corrugated glass.

A first method is to impress transverse grooves in the sheet during the rolling, so that the sheet will not be severed but simply made very thin at that point at which it is to be cut, so that the continuity of the strip be retained over the plate and in the annealing tunnel, and that the entrainment of the plastic by the rigid part is always assured in effective and uniform manner. The cutting is easily done at the exit from the annealing chamber in the ordinary manner, for example by drawing a diamond or cutting tool along the line of reduced thickness.

Figure 1 shows a construction of this device. A projection 31 carried on the upper roll 3a impresses a groove in the sheet. The space between the severing lines is then a function of the diameter of the roll. Accordingly the length of the cut sheets may be varied by modifying the diameter of the roll carrying the projection. Use may also be made of an impressing roll acting independently of the forming roll, and may be actuated by a voluntarily controlled mechanism, so that any length of strip can be severed as desired. It is, of course, understood that the impressing member, while moving in contact with the sheet, must have a linear velocity equal to that of the sheet. The cutting arrangement may be placed directly behind the forming rolls and in front of the shaping element or table and may be in the form of a roller carrying the projection with a bearing roller located opposite the same when the entrance to the shaping element or table has a flat part the cutting mechanism may consist of an impressing roller acting above this flat portion of the table.

Figure 13 is a longitudinal section of a corrugated sheet showing grooves 31a prepared according to the foregoing method for severing the strip.

The second method consists in locally heating the strip along the severing line on its exit from the annealing tunnel. This may be done, for example, by means of a continuous line of very fine gas burners mounted so as to strike the surface of the sheet and following the transverse corrugated profile.

Another method consists in applying on each side of the sheet at the severing point, a metal strip in which an intense electric current is passed. By then suddenly cooling this hot zone, for example by contact of a suitable cold tool, the sheet is broken off along the line involved. Figure 14 indicates by way of example an embodiment of this device. The corrugated sheet to be cut is shown at 32. 33, 34 are two metal strips, preferably of chrome nickel. 35, 36 two insulating layers, insulating thermally as well as electrically. 37, 38 are two resilient supports, formed of rubber or by a combination of springs. 39, 40 are two rigid plates to which the preceding members are attached respectively. These plates also carry electromagnets 41, 42 which bring them together when current passes therethrough, and springs 43, 44 which tend to hold them apart.

These strips should be fitted as accurately as possible to the contour of the sheet, notwithstanding any irregularities in the surface of the glass. It is therefore desirable that the strips be sufficiently flexible and that the layers 35, 36 have a similar yield or ability to conform to the shape of the sheet.

The following is the operation of this mechanism: When cutting is desired an electric current is passed thru the magnets 41, 42 and into the strips 33, 34 which is sufficient to retain the device on the glass sheet and the local heating for the cutting. The device being retained on the sheet moves therewith. When the heating is sufficient the current is cut off and the plates 39—40 are separated through the action of spring 43, 44. The sheet continues to advance and at this moment the cold object which effects the severing along the line heated is then applied. The device which is released from the sheet may return rearwardly for a new operation. It is apparent that the operation of such device may be controlled as desired and permits of severing the sheet in any dimension.

The invention as well as the various arrangements described is not limited to the continuous production of ordinary smooth corrugated glass, but may also be applied to that of corrugated figured glass or wire glass.

In the latter cases the apparatus consists in receiving on the shaping element or table a continuous sheet of figured or wire glass and forming it in the manner and with the suitable regulating means of the invention. The invention is applicable particularly to the continuous manufacture of corrugated glass in which the reinforcement is in the form of single metallic wires arranged parallel with each other and in the direction in which the sheet advances. Figure 15 shows an exemplary construction of this part of the invention. 45 shows a well known type of tank furnace, 46 designates the glass inlet, 47 a rolling mechanism, 48 the reinforcement formed, for example, of a metal wire network, and 49 a device for guiding the reinforcement and protecting it from the heat of the glass bath. The reinforcement is an endless strip unrolled continuously and entering the glass sheet in the region of the forming rolls. The sheet is then passed to the shaping element or table 50—51 of one of the types precedingly described.

When the reinforcement comprises transverse wires, as is the case for example with ordinary wire netting, the presence of the reinforcements resists the transverse elongation of the sheet. Use is then made of a shaper of the type indicated wherein, by combining the progressive increase of depth with corresponding spacing of the grooves, the sheet is formed without transverse elongation. When the reinforcement comprises only longitudinal wires parallel with the direction of advance of the sheet the latter may possibly draw out transversely, and use may be made of an ordinary shaper with constantly spaced grooves.

What is claimed is—

1. In apparatus for producing corrugated glass, a table for the reception of a moving sheet of glass having entrance and exit ends and provided with a progressively corrugated glass-receiving surface, said entrance end being substantially flat and said corrugations beginning at a point intermediate said ends, and alternately extending above and below the plane of the entrance end.

2. Apparatus for the continuous production of corrugated glass comprising a melting tank provided with an outlet end, means for withdrawing continuously a ribbon of glass therefrom in substantially flat form, a stationary shaping element provided with a corrugated glass-receiving surface arranged to receive said ribbon of glass and shape the same, means for applying traction to the glass ribbon to cause it to travel continuously along the corrugated surface of the shaping element, and means for cooling the glass sheet during its travel to maintain its shape.

3. Apparatus for the continuous production of corrugated glass comprising a melting tank provided with an outlet end, means for withdrawing continuously a ribbon of glass therefrom in substantially flat form, a stationary shaping element provided with a corrugated glass-receiving surface arranged to receive said ribbon of glass and shape the same, means for applying pressure to the glass sheet to force it to conform to the corrugated surface of the shaping element, and means for applying traction to the glass ribbon to cause it to travel continuously along the corrugated surface of the shaping element.

4. Apparatus for the continuous production of corrugated glass comprising a melting tank provided with an outlet end, means for withdrawing continuously a ribbon of glass therefrom, a stationary shaping element comprising a plurality of hollow sections each provided with a corrugated glass-receiving surface arranged to receive said ribbon of glass and shape the same, means for applying traction to the glass ribbon to cause it to travel continuously along the corrugated surface of the shaping element, and means for introducing a temperature-controlling medium into said hollow sections, each independently of the other whereby the temperature of the glass sheet may be progressively controlled.

5. Apparatus for the continuous production of corrugated glass comprising a melting tank provided with an outlet end, means for withdrawing continuously a ribbon of glass therefrom, a shaping element having a corrugated glass-receiving surface arranged to receive said ribbon of glass, and provided with a transverse recess below the level of the corrugations, and a counterplate located above said recess and co-operating with the shaping element to shape the glass thereon.

6. Apparatus for the production of corrugated glass sheets of predetermined length comprising a melting tank provided with an outlet opening, a rolling mill located adjacent thereto and adapted to deliver a continuous sheet of glass therefrom in substantially flat form, a shaping element adjacent the rolling mill for receiving the glass sheet, said shaping element having a corrugated glass-receiving surface to shape the glass ribbon into a corrugated glass sheet, means for imparting tractive effort to the glass to cause it to pass over said shaping element, and means positioned between said outlet opening and said shaping element for scoring the ribbon of glass transversely prior to its deformation from a substantially flat ribbon into a corrugated sheet.

7. Apparatus for the continuous production of corrugated glass comprising a melting tank provided with an outlet end, means for withdrawing continuously a ribbon of glass therefrom in substantially flat form, a stationary shaping element provided with a corrugated glass-receiving surface arranged to receive said ribbon of glass and shape the same, means for applying traction to the glass ribbon to cause it to travel continuously along the corrugated surface of the shaping element, and means located above the shaping element for applying heat to the glass sheet as it passes over the shaping element.

8. Apparatus for the continuous production of reinforced corrugated glass comprising a melting tank provided with an outlet end, means for withdrawing continuously a ribbon of glass therefrom in substantially flat form, means for feeding a wire reinforcement into the molten glass in the region of withdrawal of the same from the outlet end, a stationary shaping element provided with a corrugated glass-receiving surface arranged to receive said ribbon of glass and shape the same with the reinforcement included therein, and means for applying traction to the glass region to cause it to travel continuously along the corrugated surface of the shaping element.

9. The method of producing corrugated glass which consists in withdrawing a continuous ribbon of molten glass from a furnace in substantially flat form, sliding said ribbon on supporting lines equally spaced and parallel to the motion of said ribbon, allowing the unsupported parts of the ribbon to sink to predetermined surfaces between such supporting lines by a transverse drawing of the ribbon into a corrugated sheet and cooling the same to maintain its shape.

10. The method of producing corrugated glass sheets which consists in withdrawing a continuous ribbon of molten glass of predetermined width from a furnace in substantially flat form, and thereafter deforming said ribbon while in motion into a corrugated sheet having the same transverse unfolded width and thickness as the flat ribbon.

11. In apparatus for producing corrugated glass, a table for the reception of a continuously moving sheet of glass having entrance and exit ends and provided with a stationary corrugated glass receiving surface having spacing of the corrugations decreasing and their depth increasing in such a manner that the unfolded width of the said table being substantially constant in each transverse section from the entrance end to the exit end.

12. The method of producing corrugated glass which consists in withdrawing a continuous ribbon of molten glass from a furnace in substantially flat form, continuously moving said ribbon while plastic over the surface of a corrugated element shaped to gradually convert the ribbon into a corrugated sheet of the desired shape and then cooling the same to maintain its shape.

13. The method of manufacturing individual corrugated glass sheets which consists in withdrawing a continuous ribbon of molten glass from a furnace in substantially flat form, scoring said ribbon transversely at predetermined points while moving, continuing the movement of the scored ribbon along a supporting element and converting the same into a corrugated ribbon, cooling the corrugated ribbon and thereafter separating the corrugated ribbon along the score line into individual corrugated sheets.

14. The method of producing corrugated glass which consists in continuously feeding molten glass in substantially flat form through a forming pass at the exit end of a glass furnace and thereafter moving said glass continuously over and along the surface of a corrugated shaping element and allowing the glass to settle by gravity and thereby conform to the surface contour of the shaping element.

15. The method of producing corrugated glass sheets which consists in withdrawing a continuous ribbon of molten glass from a furnace moving the ribbon continuously over and along the surface of a shaping element provided with a corrugated glass-receiving surface, applying pressure to the surface of the glass remote from the shaping element during its movement to force the same to conform to the glass-receiving surface of the shaping element and thereafter cooling the glass to maintain its shape.

LOUIS BOUDIN.
HENRI POEYMIROU.